Feb. 10, 1948.  A. H. MANNING ET AL  2,435,927
DRYING AND DISINTEGRATING OF GAS-BORNE MATERIAL
Filed Sept. 13, 1944    3 Sheets-Sheet 1
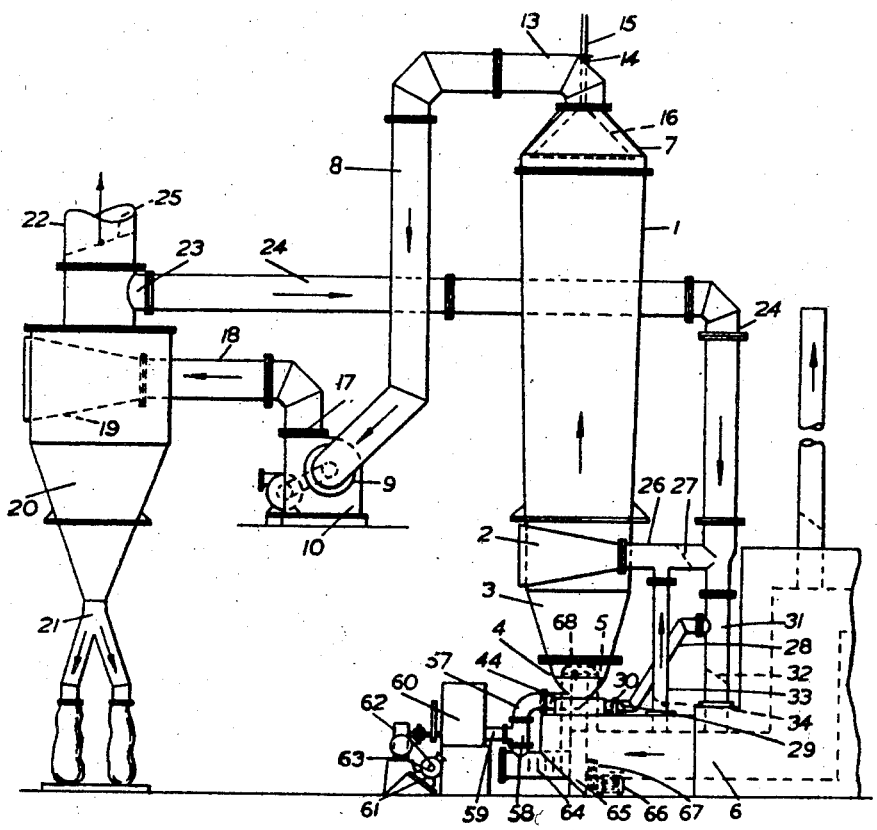

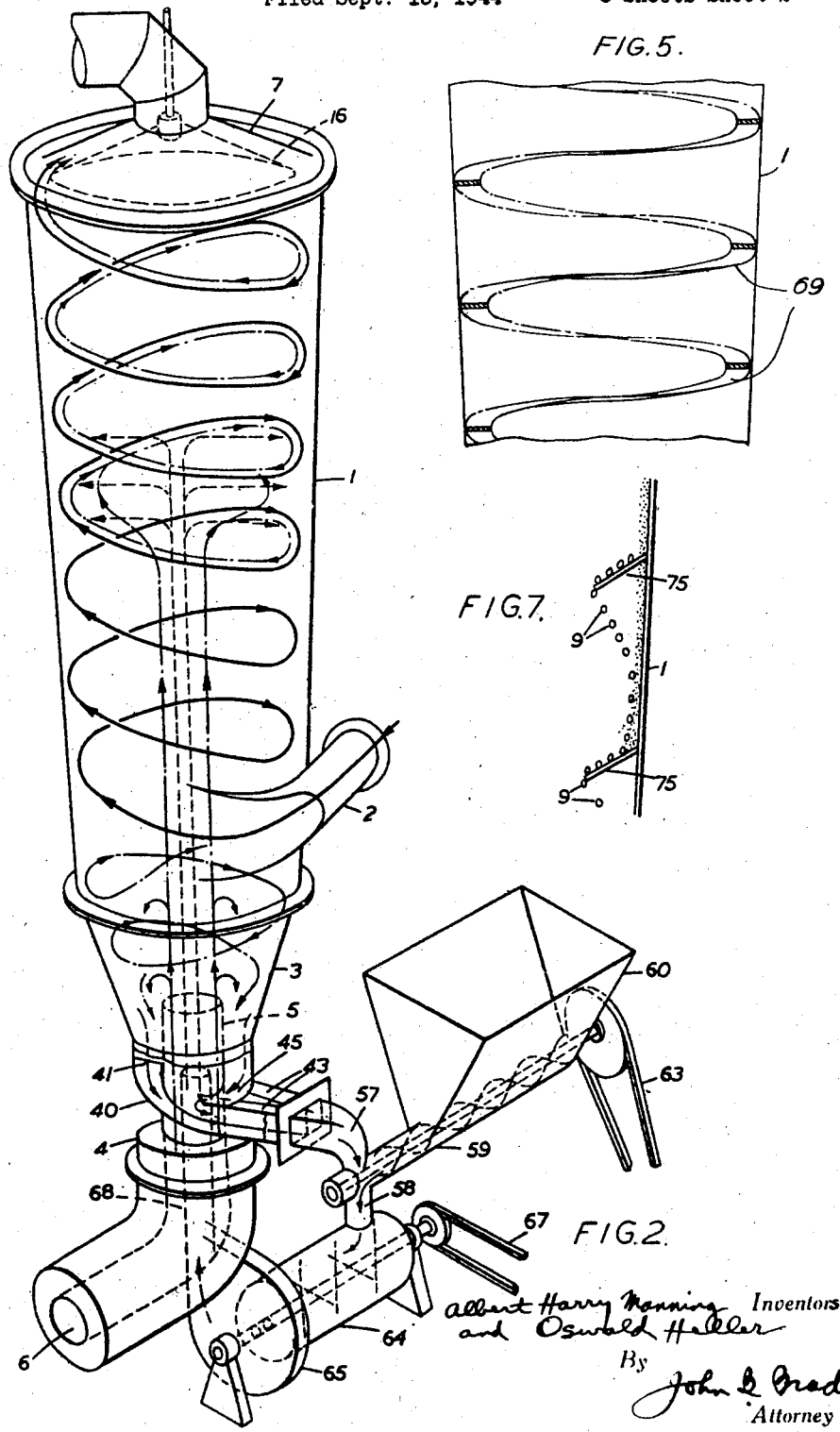

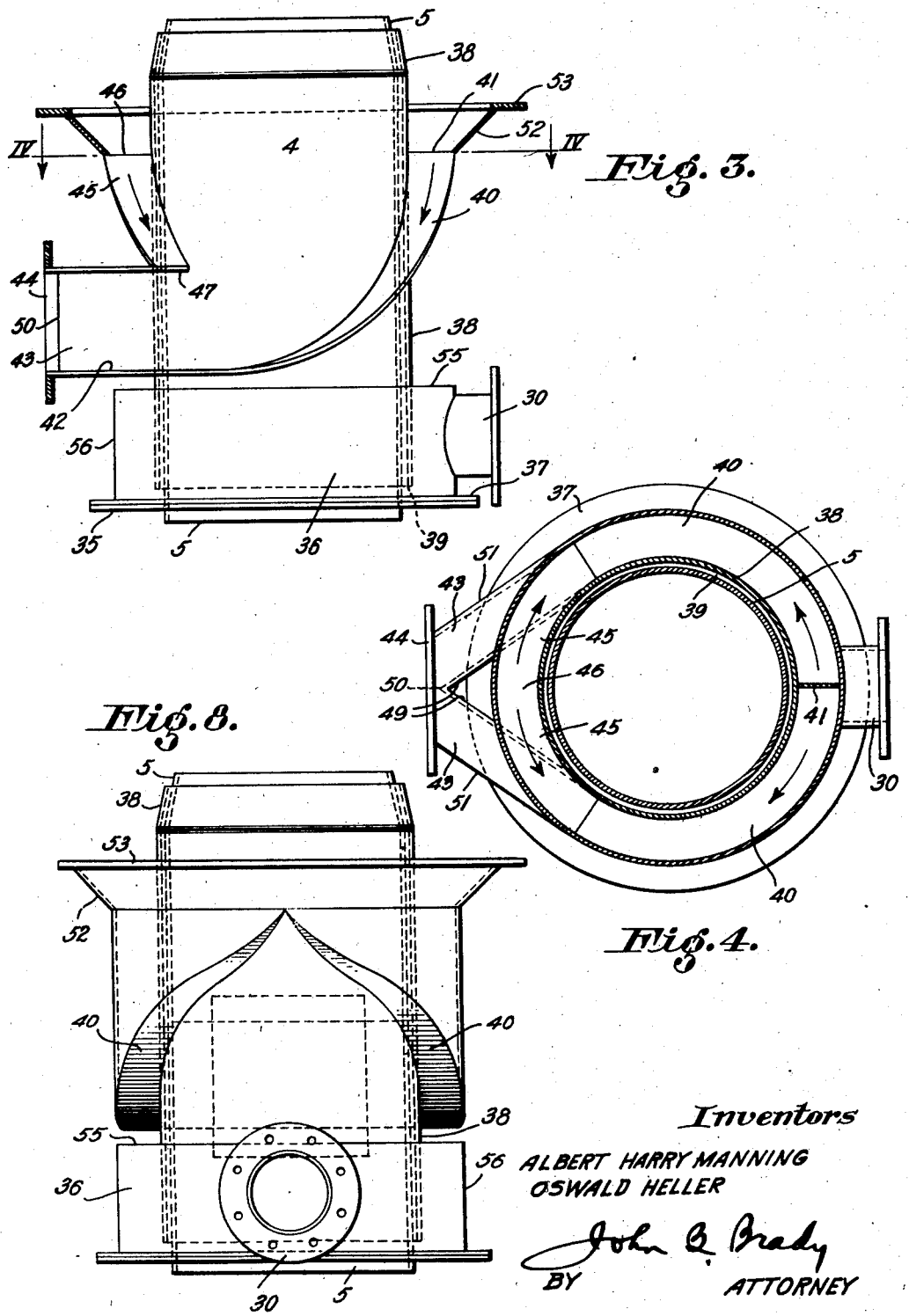

UNITED STATES PATENT OFFICE 2,435,927

DRYING AND DISINTEGRATING OF GAS-BORNE MATERIAL

Albert Harry Manning and Oswald Heller, London, England; said Heller assignor to said Manning Application September 13, 1944, Serial No. 553,902
In Great Britain August 7, 1943

Section 1, Public Law 690, August 8, 1946
Patent expires August 7, 1963

14 Claims. (Cl. 241—17)

This invention relates to the method of drying materials by means of hot gases which carry the material through a drying zone between a disintegrating and/or feeding device and a separating chamber in which the dried material is removed from the gas, with or without an intermediate separation to return the coarser or incompletely dried elements or particles to the hot gas stream, while the lighter elements or particles (hereinafter referred to as elements) are carried onwards to the settling or filter chamber.

For carrying out the aforesaid drying method according to the invention, a stream or jet of wet material, and an enveloping carrier flow of hot gas, are propelled upwards and axially within a surrounding, rising, helical flow of warm gas to a zone at, which, having lost its initial momentum, the axial flow disperses radially into the helical flow to effect a gravity separation of the lighter and heavier elements of the material, the lighter elements being discharged upwards with the mixed gases and the heavier elements remaining in the helical flow for a longer or shorter time until either they are dried and thereby lightened sufficiently to be discharged upwardly or they fall through and out of the bottom of said helical flow, the tailings thus falling out of the bottom of the helical flow are conveyed in a recirculating warm gas stream, fresh wet material is fed into the recirculating gas, and said gas is propelled with the fresh wet material and tailings upwards into the enveloping, carrier flow of hot drying gas.

The method according to the invention may advantageously be applied to the drying of organic materials of the nature of human or animal foods, e. g., vegetables, herbs, grass, beet leaves, food waste or fish products. It is, however, also applicable to the drying of inorganic compounds or industrial organic compounds, and in fact any material which can be carried in a gas stream. The size of the elements of the material is unimportant so long as their form is such as to facilitate the evaporation of adsorbed moisture, that is, so that they present an extensive surface area in relation to their mass. Thus, relatively large elements such as edible leaves can usefully be subjected to the drying method with the aid of a suitable feeding device, especially as the thinner and quicker dried portions of such leaves tend to break off from the still wet portion as they dry.

At the zone where the axial flow of hot gas is dispersed its temperature is reduced by the drying effect inside the jet and then further and sharply by incorporation in the cooler helical flow, so that the material is subjected for a very short time to exposure to the hot gases (during which it is dried to the extent of losing its sticking properties), and is then enveloped in the cooler mixture the temperature of which can be easily controlled, for example, limited to a degree which the material can support for a much longer period without suffering damage.

The heavier elements falling out of the helical flow may, while being conveyed back into the axial flow of hot gases and wet material, be subjected to a further cutting, breaking, bruising or like treatment so that they present fresh moist surfaces to the hot gases. The recirculating gas stream conveying of these elements may originate in gases eddying from the hot gas flow, with or without gases eddying from the bottom of the helical flow, whereby drying of the newly fed material is effected before and while it passes through the propelling means.

Preferably, the warm gas of the helical flow is taken from the outlet of the final separating chamber wherein the wholly dried elements are removed from the gases, the excess gases being discharged from the drying system. The temperature of the warm gas (which may be of the order of 100°–200° C.) may be regulated, if required, by the controlled admixture of hot gases.

The hot gases of the axial flow (which may have a temperature of the order of 500° C. and upwards) may be combustion products taken directly from a furnace and diluted, if necessary, with a portion of the warm gases, or with air, so as to adjust their temperature to a degree tolerable without damage by the material to be dried.

The dilution of the combustion products with return gases from the settling chamber is preferable in order to minimise the oxygen content of the gases in the case of materials susceptible to oxidation or carbonisation in their drier state. Moreover, the steam content of the diluent gases is advantageous by reason of its high specific heat and its protective effect against oxidation.

The drying, according to the present invention, may be carried out in a vertically elongated chamber of circular cross-section having, at its lower end, an axial nozzle for hot gases and a jet through which the wet material is propelled upwards into the chamber centrally within the nozzle, and, above its lower end, a tangential inlet for warm gases, a discharge opening at the top of the chamber being connected to the suction side of a fan which serves to induce the axial flow of hot gas and the tangential flow of warm gas. A baffle vertically adjustable relative to the top of the chamber may be provided for controlling the speed of the gases discharged from the chamber.

The heavier of the dispersed or outwardly diverted elements of material which are not immediately carried off by the gases, are whirled round by the rising helical flow of the warm gases, and thrown by centrifugal force as a layer against the peripheral wall of the chamber. Evidently, these elements will fall at a speed dependent on their residual wetness or their abnormal size. In the former case, it is possible that they may be dried in the helical flow to such an extent that they are again lifted to the top of the chamber and discharged, while if they are abnormally dense or wet, they will eventually fall completely through the helical flow and past the zone of the tangential inlet to the bottom of the drying chamber.

The diameter of the chamber above the tangential inlet may increase, preferably slightly, towards the top. The slope of the wall causes an upward component of the centrifugal force acting on the gyrating material to assist the upward movement thereof. Further, the helical flow of gas, maintaining substantially uniform speed, undergoes a decrease of angular velocity and a diminution of pitch or upward velocity towards the top of the chamber, thereby enabling a higher degree of uniformity of classification of the dried material at the top of the chamber and longer retention of the heavier elements falling towards the bottom of the helical flow. Moreover, the increase of gas speed towards the discharge outlet at the top of the chamber can be regulated by gradual variation of the annular area between the edge of the vertically movable baffle and the upper part of the tapering chamber wall (rather than by variation of the space between the top surface of the baffle and the top of the chamber) so allowing the degree of fineness of the discharged dry elements to be closely controlled.

In order to delay the falling of the heavier elements, and to guide the whole of the material in a regulated stream, the wall of the chamber may be provided with at least one continuous or interrupted narrow helical vane. In the shallow channels formed by the shell and each two adjacent turns of the vane or vanes, the heavier elements will tend to gravitate to the lower vane, and so, if there is any substantial disparity of size in the elements, the vanes are preferably interrupted in order that periodically these heavier elements drop across the helical gas stream to afford it an opportunity of lifting them towards the top of the chamber. Thereby an extremely thorough classification of the elements is effected, and only that proportion having abnormal wetness or density passes completely down to the bottom of the chamber.

When the diameter of the chamber increases, as above mentioned, from the bottom of the top, the elements shuffling round the inner surface of the wall under centrifugal force tend to be lifted up from the vanes. There is thus a continuous tendency for the elements to become gas-borne as soon as they are sufficiently lightened by drying, and an aggregation of elements which have been sufficiently dried with heavier and still wet elements on the helical vanes is prevented.

The helical vanes, especially if continuous, may be disposed with a downward and inward slope from the wall of the drying chamber, so that the elements which are too heavy to be sustained by the centrifugal force are diverted inwards and fall through the helical gas flow. When the drying chamber is tapered, these elements may undergo a further partial drying and be thrown between lower portions of the vanes so as to be guided upwards again towards the discharge outlet at the top of the chamber.

A duct is disposed at the bottom of the drying chamber by which the tailings are returned to the material propelling means, which may then take the form of rotary fan or thrower, and may incorporate breaking or bruising means or be associated with cutting, breaking, bruising or like means so that the elements are further divided or given fresh exposed moist surfaces before being propelled again into the drying chamber. The mixing of these tailings with the incoming fresh material lowers the average moisture content of the feed. Further, the conveyance of the tailings from the bottom of the drying chamber to the feeding device may be effected by a flow of high temperature gases induced from the bottom of the drying chamber by the rotary thrower, for example, hot gases eddying from the periphery of the hot gas nozzle, with or without admixed warm gases eddying from the bottom of the helical flow, or alternatively, warm gas taken for example from the gas duct between the outlet of the settling chamber and the tangential inlet to the drying chamber by which conveying gases preheating and preliminary drying of the fresh feed material is effected.

In order to prevent damage to the tailings when the material being dried is susceptible to heat, the hot gas nozzle may be jacketed, for example, with a layer of cool gas induced from the outlet of the settling chamber, and flowing between the wall of the nozzle and a concentric supplementary wall.

An embodiment of apparatus for carrying out drying according to the method of invention and various modifications, will be described with reference to the accompanying drawings, wherein Fig. 1 is a diagrammatic arrangement of a complete drying plant.

Fig. 2 shows diagrammatically the flow of gases and material in the drying chamber.

Fig. 3 is a view on a larger scale of a detail.

Fig. 4 is a sectional plan on the line IV—IV of Fig. 3.

Figs. 5, 6 and 7 are diagrammatic views of detail modification, and

Fig. 8 is an end elevational view of the detail shown in Fig. 3.

Referring to Fig. 1, the drying apparatus proper consists of a chamber in the form of a column 1, of circular cross section. Adjacent the lower end of this column is disposed a tangential warm gas inlet 2, and the diameter of the column increases slightly from above this inlet to the top. The base 3 of the drying column tapers a little more sharply downwards, and is connected at its lower end to a base member 4, which is shown in greater detail in Figs. 3 and 4. This base member includes a large nozzle member 5, the lower end of which is open to a duct 6 for hot gases such as combustion products from a furnace (not shown).

The upper end of the drying column 1 is provided with a conical cover member 7 communicating with a gas duct 8 which leads to the suction branch 9 of a fan 10. The elbow member 13 of the duct 8, which is connected directly to the cover 7 carries guide means 14 for the shank 15 of a conical baffle member 16 which is vertically adjustable inside the cover by external linkage means (not shown) attached to the shank.

The discharge orifice 17 of the fan 10 communicates by way of a gas duct 18 with the tangential inlet 19 of a cyclone 20 constituting a final settling chamber, the bottom of which is provided with discharging means for the product shown as a breeches duct 21 affording a plurality of bagging chutes. The exhaust chimney 22 from the cyclone is provided with a lateral branch 23 to a return gas duct 24 and with a damper 25 operable to divert an adjustable proportion of the cyclone exhaust gases into said branch. The duct 24 has a branch 26 controlled by a damper 27, communicating with the tangential inlet 2 of the drying column, a branch 28 controlled by a damper 29 communicating with a branch 30 on the base member 4, and a branch 31, controlled by a damper 32, communicating with the hot gas duct 6. A duct 33, controlled by a damper 34, also connects the hot gas duct 6 to the branch 26 on the drying column side of the damper 27.

The base member 4, as more clearly shown in Figs. 3 and 4 comprises the hot gas nozzle member 5, having at its lower end a flange 35. The branch 30, already referred to is mounted on an annular box 36 which carries at its lower side a flange 37 bolted to the flange 35 and at its upper side a casing 38 closely surrounding the nozzle 5, and having its lower end depending into the box 36. A passage is thus afforded for warm gas coming from the cyclone outlet by way of the duct 24 and branch 28 to the branch 30 into the box 36 and up the narrow annular space 39 between the nozzle 5, and casing 38 to constitute a protective and cooling jacket for the hot gas nozzle 5. Secured as by welding to the exterior of the casing 38 are a pair of ledges 40 oppositely inclined downwards from an apex 41, and sweeping round to straight portions 42 constituting the bottom surfaces of a pair of converging rectangular section ducts 43 which meet to form a single flanged branch 44. Another pair of ledges 45, oppositely inclined downwards from an apex 46 diametrically spaced from the apex 41, sweep round to meet at 47 the upper surfaces 48 of the ducts 43. The inner side walls 49 of these ducts are disposed tangentially to the casing 38 and meet at the line 50 inside the opening of the branch 44. The outer side walls 51 of the ducts 43 (the nearer of which is omitted for clarity in Fig. 3) are extended upwards each between the outer edges of the inclined ledges 40 and 45 on one side of the member to the level of the apices 41 and 46 where together they present a complete circular edge to which is secured a conical member 52 with a flange 53 by which the base member 4 as a whole is attached to the conical bottom portion 3 of the drying column. The upper edge of the circumferential wall 56 of the box 36 is closed by a horizontal plate 55 of annular form welded at its outer edge to the top of the vertical wall 56 of the box 36 and at its inner edge to the casing 38.

Referring again to Fig. 1 the branch 44 of the base member 4 is shown connected by an elbow member 57 to a T member 58. The side branch of the latter is connected to a worm casing 59 of a screw feeder hopper 60, driven by an electric motor 61 through a worm and worm wheel speed reduction gear 62 and a variable speed belt gear 63. The lower branch of the T member 58 communicates with the upper side of the casing of a rotary cutting or disintegrating device 64, coaxially associated with a centrifugal thrower device 65 driven by an electric motor 66 through a belt gear 67. The thrower has fitted on its discharge aperture a jet 68 which projects upwards coaxially within the hot gas nozzle 5.

In the operation of the plant as shown in Fig. 1, the material to be dried is fed into the hopper 60 and discharged by the worm-feeder into the T-member 58 whence it falls into the rotary cutter or disintegrator 64, and passes along it to the thrower 65 which operating on the centrifugal fan principle, creates a suction at its intake. The cut or disintegrated material is propelled through the jet 68 up the centre of the drying chamber 1.

The gas circulation is effected by the fan 10 which creates a sub-atmospheric pressure through the duct 8 in the drying chamber 1, and an elevated pressure through the duct 18 in the cyclone 20, according to the draught loss in the cyclone and in its chimney 22. By the reduction of pressure in the drying chamber, hot gases are induced through the nozzle 5, around the jet 68, from the hot gas supply duct 6 and flow up the middle of the chamber 1, enveloping the wet material. Further, by the pressure difference between the cyclone outlet 22 and the drying chamber 1, cooled but still warm gases admixed with water vapour evaporated from the set material are caused to flow by way of the duct 24 and through the branch 26 into the tangential inlet 2. The quantity of warm gas passing through the duct 24 is controlled by the damper 25, which in normal operation allows to pass out of the system into the exhaust chimney 22 a quantity of gas proportionate to the hot gas intake and the water vapour evaporated from the wet feed material. Part of the warm gas flowing through the duct 24 passes through the branch 28 under control of the damper 29, into the branch 30 of the base member 4 and flows into the chamber 1 through the annulus 39 between the casing 38, and nozzle 5 to provide a jacket of merely warm gas about the hot gas nozzle and cool the latter. Further, if desired, part of the warm gas from the duct 24 may be allowed to pass through the branch 31, under control of the damper 32, to reduce the temperature of the hot gases in the event that this is too high to be borne without damage by the wet material notwithstanding the short duration of contact between the wet material and hot gases as will be explained. The temperature of the warm gas flow through the tangential inlet 2 may also be raised, if desired, by operating the damper 27 in branch 26 and the damper 34 in duct 33, to create differential pressure conditions causing a controlled quantity of hot gas to pass from the duct 6 up the duct 33 to mix with the warm gas passing through the branch 26 to the tangential inlet 2.

The action which takes place within the drying chamber is diagrammatically shown in Fig. 2. The wet material is thrown at high velocity up the jet 68 as indicated by dotted lines enveloped by hot gas induced at high velocity through the nozzle 5 as indicated by chain-dotted lines. The elements of wet material and the hot gases quickly lose their upward momentum and disperse radially. The hot gases intermingle with the flow of warm gas which has entered tangentially by the inlet 2 and risen helically under the joint influence of centrifugal force and the suction exerted by the fan at the top of the column, as indicated by the full line.

The period of contact of the wet material with the hot gas alone is sufficient to evaporate at least surface moisture and remove any tendency for the material to stick to the wall of the chamber, but not long enough to cause any damage to the material if it is, for example, of a carbonisable nature, or otherwise susceptible to heat. As soon as the hot gases and material disperse, evidently the gases attain a mean temperature which is controlled by adjustment of the warm gas quantity to a level which the material can sustain for a longer period, or indefinitely, without damage. The material is now driven round the wall of the chamber under centrifugal force and upheld solely by the vertical component of the motion of the gases, which corresponds to a relatively slow upward speed. Thus only the lightest and driest elements are carried upwards and as the diameter of the chamber increases and the angular velocity of the gases proportionately decreases even the heavier of these lightest elements are delayed a little so as to be held in the warm gases for a longer time and completely dried.

The conical baffle 16 is adjusted vertically to vary the annular space between its lower edge and the slightly tapering wall of the chamber, to achieve a very close control of the vertical velocity of the gases withdrawn from the top of the chamber by the fan 10, and thus to effect a fine classification of the dried elements discharged which are passed, still in the warm gas flow through the fan to the cyclone 20 where they are separated from the gases and settle into the breeches duct 21 for bagging.

Those of the material elements which are too heavy, on account either of their size or wetness, to be lifted by the rising helical gas flow either float about at the dispersal level in the chamber until they are lightened by further drying and carried off, or else they commence whilst still being whirled round the wall of the chamber, to fall more or less slowly through the helical flow. If their weight is due to residual moisture they may be further dried in this gas, lifted up and discharged, but if they are excessively wet or denser than the average element they can fall eventually to the bottom of the drying chamber. Here these elements or tailings pass down the inner surface of the portion 3 on to the inclined ledges 40 and 45 of the base member 4 (see Fig. 2), being protected from the burning on the hot gas nozzle 5 by the cool gas jacket 38, and are swept in the directions shown by arrows in Figs. 3 and 4 by a flow of gas induced from the bottom of the drying chamber by the suction effect of the centrifugal thrower 65 through the ducts 43, 57, and 58 in the rotary cutter or disintegrator 64. Here they mingle with fresh wet material fed in through the worm casing 59 and are again subjected to a cutting, breaking or bruising action so that their size is further reduced or fresh moist surfaces are exposed before they are again propelled by the thrower 65 up the jet 68. Incidentally, by the admixture of the tailings with the fresh feed the overall wetness of the newly fed material reduced and the tailings which being partly dried might be susceptible to the hot gases on reheating, are superficially moistened and thus protected. By their accompanying warm or hot gas flow a high degree of pre-drying is effected in the cutter or disintegrator and the thrower.

Figs. 5 and 6 are alternative diagrammatic axial sections of a portion of the drying column 1 showing vanes provided on the inner surface of the wall to guide the helical gas flow and the material under its influence in a controlled stream. As shown in Fig. 5, the vane 69 is a continuous helix, and as is shown in Fig. 6 vane members 74 are disposed in the locus of a single helix with spaced interruptions. The effect of the interrupted vanes is represented by arrows. Between each two turns the gases flow in a substantially uniform stream as indicated by arrows a, b, and c. The material elements are borne around by the gas stream, but the heavier elements tend to gravitate towards the lower vane. Those elements which are too heavy to be carried across the gaps fall through as indicated by arrows d, and are again classified according to their weight and bulk. It will be understood that the drying is continuing all the time and some of the elements dropping through the gap will simultaneously reach the degree of dryness enabling them to be picked up by the gas stream following the path indicated by arrows e. Others, being still too dense, will fall on to the next lower turn of the vane as indicated by arrow f, and through a gap in that turn. This process of segregation is continuously operative in the course of the general motion described with reference to Fig. 2.

In order to divert the heavier elements away from the wall of the chamber to which they tend to be pressed by their greater centrifugal force, the vanes 75 may be downwardly inclined as shown in Fig. 7. The more or less completely dried material shuffles round the inner surface in a helical stream with the lighter elements tending to be lifted up the surface and the heavier elements tending to roll or slide on the vanes. When the latter are inclined as shown, the heavier elements slide inwards and drop as indicated at g freely through the gas flow so as to be completely exposed to the drying effect. Such inclined vanes may also be interrupted.

The interruptions in the vanes are preferably to be relatively disposed so that the heavier elements falling from one turn of the vane or vanes to the next lowermost, under the joint influence of gravity and the gas flow do not pass successively through the gaps in two or more turns. This spacing may be determined experimentally for different materials and speeds of gas flow.

The apparatus may be modified without exceeding the scope of the invention. For example, the relative arrangement of the drying column, fan and the separating chamber may be altered. The separating chamber may be of any type other than the cyclone by which it is represented herein. The wet material feeding means may be of any suitable construction for its purpose. Further, the warm gas supply may be taken from any available source other than the outlet from the settling or filter chamber, and the hot gas flow may be a portion of the warm gas supply which is separately reheated.

Evidently, the invention affords an advantageous method of drying gas-borne materials, and plant for carrying out the method, in which a highly effective drying can be performed. Fine subdivision or disintegration of the feed is rendered unnecessary, since the method automatically effects an extremely thorough classification of the elements of the material and affords the possibility of repeated subdivision and reheating of the larger elements. Indeed, with edible leaves or other organic materials in substantially laminar form, the feed can consist of elements of comparatively large area (of the order of 25 square inches). Further, the provision of a secondary warm gas flow in helical form enables long contact between the material and warm gas, after the short intense heating in the hot gas, in a drying chamber of very low height or length of path relative to the hitherto known uniflow type of carrier-gas drying apparatus, and the duration of this long contact may be controlled, in relation to the density of the material and the ultimate particle size required, by determination and regulation of either the peripheral speed and the pitch, or both, of the helical flow of warm gas.

We claim:

1. The method of drying gas-borne material consisting in creating an externally confined, rising, helical flow of warm drying gas, carrying a stream of wet material in an enveloping flow of hot drying gas upwards and axially to a zone within said helical flow at which, having lost its initial momentum, the axial flow of gas disperses with the material radially into said helical flow wherein a gravity separation of the lighter and heavier elements of the material is effected, discharging said lighter elements upwardly with the mixed gases, and conveying the tailings which fall out of the bottom of the helical flow in a recirculating warm gas stream, introducing fresh wet material into the recirculating gas, and propelling the recirculating gas with the fresh wet material and tailings upwards into the enveloping, carrier flow of hot drying gas.

2. The method of drying gas-borne material consisting in creating an externally confined, rising, helical flow of warm drying gas, carrying a stream of wet material in an enveloping flow of hot drying gas upwards and axially to a zone within said helical flow, at which, having lost its initial momentum, the axial flow of gas disperses the material radially into said helical flow wherein a gravity separation of the lighter and heavier elements of the material is effected, discharging said lighter elements upwardly with the mixed gases, conveying the tailings which fall out of the bottom of the helical flow in a recirculating warm gas stream, introducing fresh wet material into the recirculating gas, acting physically upon the fresh wet material and the tailings in the recirculating gas to disintegrate said material and cause said tailings to present fresh moist surfaces to the gases, and propelling the recirculating gas with the material and tailings upwards, into the enveloping, carrier flow of hot drying gas.

3. The method of drying gas-borne material consisting in creating an externally confined, rising, helical flow of warm drying gas, carrying a stream of wet material in an enveloping flow of hot drying gas upwards and axially to a zone within said helical flow, at which, having lost its initial momentum the axial flow of gas disperses with the material radially into said helical flow wherein a gravity separation of the lighter and heavier elements of the material is effected, discharging said lighter elements upwardly with the mixed gases, separating the lighter elements from the mixed gases and recirculating a portion of the mixed gases to constitute said rising helical flow, and conveying the tailings which fall out of the bottom of the helical flow in a recirculating warm gas stream, introducing fresh wet material into the recirculating gas with the fresh wet material and tailings upwards into the enveloping, carrier flow of hot drying gas.

4. The drying method according to claim 3, including regulating the temperature of the warm gas of the helical flow by the controlled admixture of hot gas.

5. Drying apparatus for gas-borne material, comprising, in combination, a vertically elongated drying chamber of circular cross-section, a nozzle located axially at the lower end of the chamber, a jet centrally within the nozzle, means for propelling wet material upwards through the jet, means for supplying hot drying gas to the nozzle, a tangential inlet to the chamber above the level of the nozzle, means for supplying warm gas to the tangential inlet, a discharge opening at the top of the chamber, at least one fan in communication with the chamber for causing the hot gas to flow through the nozzle into the chamber axially and the warm gas to flow through the tangential inlet and circulate about the chamber and for discharging the gas and the dried elements of the material carried thereby through the discharge opening, means feeding wet material to the inlet of the material propelling means, and a tailings duct extending from the bottom of the drying chamber to the inlet of the material propelling means.

6. Drying apparatus for gas-borne material, comprising, in combination, a vertically elongated drying chamber of circular cross-section, a nozzle located axially at the lower end of the chamber, a jet centrally within the nozzle, means for propelling wet material upwards through the jet, means for supplying hot drying gas to the nozzle, a tangential inlet to the chamber above the level of the nozzle, means for supplying warm gas to the tangential inlet, a discharge opening at the top of the chamber, at least one fan in communication with the chamber for causing the hot gas to flow through the nozzle into the chamber axially and the warm gas to flow through the tangential inlet and circulate about the chamber and for discharging the gas and the dried elements of the material carried thereby through the discharge opening, means for disintegrating wet material discharging into the inlet of the material propelling means, a feeder supplying wet material to the intake of the disintegrating means, and a tailings duct extending from the bottom of the drying chamber to the intake of the disintegrating means.

7. Drying apparatus for gas-borne material comprising, in combination, a vertically elongated drying and separating chamber of circular cross-section, a nozzle located axially at the lower end of the chamber, means for supplying hot drying gas to the nozzle, a tangential inlet to the chamber above the level of the nozzle, a discharge opening at the top of the chamber, a centrifugal fan having its suction branch in operative communication with the discharge opening, a cyclone separating chamber in operative communication with the discharge branch of the fan, a delivery branch for dried and separated material at the bottom of the cyclone, an outlet for material-free warm gases from the cyclone, a duct branching from said outlet and communicating with the tangential inlet to the drying chamber to supply warm gas to said inlet, the fan serving to induce into the drying chamber an axial flow of hot gas through the nozzle and a rising, helical flow of warm gas through the tangential inlet and to such the mixed gas with the dried elements of the material from said chamber, a three-branch pipe member, a mechanical feeder propelling wet material into one branch of said pipe member, a jet located centrally within the hot gas nozzle, a centrifugal thrower having its discharge branch in communicating alignment with the jet, rotary cutting means axially associated with the thrower, a casing about the cutting means constituting an intake duct for the thrower, an intake branch on said casing communicating with another branch of said pipe member, and a tailings duct extending from the bottom of the drying chamber to the third branch of said pipe member, the centrifugal thrower being adapted to exert through the cutter casing, said pipe member and said tailings duct a suction effect to draw drying gas with the tailings from the bottom of the drying chamber, and to propel such gas and tailings with the wet material axially upwards, within the hot gas flow, into the chamber.

8. Drying apparatus for gas-borne material comprising, in combination, a vertically elongated drying chamber of circular cross-section, a nozzle located axially at the lower end of the chamber, a jacket concentrically surrounding the nozzle and therewith defining an annular space open top and bottom, the open top communicating with the lower end of the chamber, an annular box surrounding the nozzle and in communication with the open bottom of said annular space, an inlet to said box, a tangential inlet to the chamber above the level of the nozzle, means for supplying warm gas to said two inlets, means for supplying hot drying gas to the nozzle, a jet coaxially within the nozzle, means for propelling wet material upwards through the jet, and at least one fan in communication with the chamber for causing hot gas to flow through the nozzle into the chamber axially, warm gas to flow through the inlet to the annular box and the communicating annular space into the chamber concentrically about the hot gas flow, and warm gas to flow through the tangential inlet and circulate about the chamber, and for discharging the gases and dried elements of the material carried thereby through the discharge opening, means feeding wet material to the inlet of the material propelling means, and a tailings duct extending from the bottom of the drying chamber to the inlet of the material propelling means.

9. Drying apparatus according to claim 5, including, in combination, a baffle of substantially corresponding shape to the top of the drying chamber, said baffle being vertically adjustable to regulate the area of the discharge opening and thereby the speed of the gases discharged.

10. Drying apparatus according to claim 5, the drying chamber being of slightly increasing diameter from above the tangential inlet to the top of the chamber.

11. Drying apparatus according to claim 5, including, in combination, at least one narrow vane projecting inwardly from the wall of the chamber and rising helically from adjacent the tangential inlet to guide the warm gases entering by said inlet towards the discharge opening.

12. Drying apparatus according to claim 5, including at least one narrow vane projecting inwardly from the wall of the chamber and rising helically from adjacent the tangential inlet to guide the warm gases entering by said inlet towards the discharge opening, the vane being continuous up the lateral wall of the chamber.

13. Drying apparatus according to claim 5, including at least one narrow vane projecting inwardly from the wall of the chamber and rising helically from adjacent the tangential inlet to guide the warm gases entering by said inlet towards the discharge opening, the vane being constituted by spaced segments disposed in a helical locus, as specified.

14. Drying apparatus according to claim 5, including at least one narrow vane projecting inwardly from the wall of the chamber and rising helically from adjacent the tangential inlet to guide the warm gases entering by said inlet towards the discharge opening, the vane being inclined downwardly and inwardly from the chamber wall, as specified.

ALBERT HARRY MANNING.
OSWALD HELLER.

REFERENCES CITED

The following references are of record in the file of this patent:

UNITED STATES PATENTS

| Number | Name | Date |
|---|---|---|
| 748,894 | Trump | Jan. 5, 1904 |
| 749,574 | McAuley | Jan. 12, 1904 |
| 1,038,886 | Hert | Sept. 17, 1912 |
| 1,213,887 | Krause | Jan. 30, 1917 |
| 1,513,622 | Manning | Oct. 28, 1924 |
| 1,733,022 | Koon | Oct. 22, 1929 |
| 1,772,974 | White | Aug. 12, 1930 |
| 1,816,408 | State | July 28, 1931 |
| 1,840,857 | Testrup et al. | Jan. 12, 1932 |
| 2,023,247 | Senseman | Dec. 3, 1935 |
| 2,054,441 | Peebles | Sept. 15, 1936 |
| 2,055,385 | Noack | Sept. 22, 1936 |
| 2,106,869 | Falkenstein et al. | Feb. 1, 1938 |
| 2,288,613 | Dill | July 7, 1942 |
| 2,313,956 | McGrane | Mar. 16, 1943 |
| 2,351,091 | Bar | June 13, 1944 |
| 2,362,528 | Balz | June 3, 1942 |

FOREIGN PATENTS

| Number | Country | Date |
|---|---|---|
| 576,056 | Great Britain | Mar. 19, 1946 |

OTHER REFERENCES

"The Drying of Grass and Grain," page 98 of International Industry, Mar. 1944. (Copy available in Div. 49.)